(12) United States Patent
England et al.

(10) Patent No.: US 8,235,113 B2
(45) Date of Patent: Aug. 7, 2012

(54) METHOD OF IMPROVING RECOVERY FROM HYDROCARBON RESERVOIRS

(75) Inventors: Kevin England, Houston, TX (US); Joseph Ayoub, Katy, TX (US); Bernard Montaron, Dubai (UA); Matthew Miller, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 335 days.

(21) Appl. No.: 12/440,037

(22) PCT Filed: Aug. 20, 2007

(86) PCT No.: PCT/GB2007/003168
§ 371 (c)(1),
(2), (4) Date: Dec. 14, 2009

(87) PCT Pub. No.: WO2008/029081
PCT Pub. Date: Mar. 13, 2008

(65) Prior Publication Data
US 2010/0108316 A1 May 6, 2010

(30) Foreign Application Priority Data
Sep. 8, 2006 (GB) .................................. 0617715.8

(51) Int. Cl.
*E21B 43/22* (2006.01)
*E21B 43/16* (2006.01)

(52) U.S. Cl. ...................... 166/270.2; 166/275; 166/270
(58) Field of Classification Search .................. None
See application file for complete search history.

(56) References Cited

U.S. PATENT DOCUMENTS

| 3,498,378 | A | * | 3/1970 | Graham et al. ............... 166/263 |
| 4,851,394 | A | | 7/1989 | Kubodera |
| 4,851,395 | A | | 7/1989 | Ueno et al. |
| 5,041,225 | A | | 8/1991 | Norman |
| 5,551,516 | A | * | 9/1996 | Norman et al. ............ 166/308.2 |
| 5,909,774 | A | * | 6/1999 | Griffith et al. ................ 166/312 |
| 6,069,118 | A | * | 5/2000 | Hinkel et al. ................. 507/277 |
| 7,350,572 | B2 | * | 4/2008 | Fredd et al. .................... 166/279 |

OTHER PUBLICATIONS

Gregor et al, "Synthetic-Membrane Technology", Scientific American, vol. 239, pp. 112-128 (1978).
Richard Durbin, "Osmotic flow of water across permeable cellulose membranes", Journal of General Physiology, vol. 44, pp. 315-326 (1960).

* cited by examiner

*Primary Examiner* — Angela M DiTrani

(57) ABSTRACT

A method of increasing the recovery of hydrocarbons from a highly fractured reservoir uses the steps of injecting into the reservoir a membrane-forming fluid to form a membrane over the surface of at least part of exposed formation, injecting into the reservoir a fluid to establish a chemical potential gradient across the membrane and letting fluid enter the formation across the membrane to increase the pressure inside the formation and to force additional hydrocarbon from the formation.

14 Claims, 3 Drawing Sheets

METHOD OF IMPROVING RECOVERY FROM HYDROCARBON RESERVOIRS

This invention relates to a method of improving recovery from hydrocarbon reservoirs, particularly naturally fractured reservoirs or reservoirs of carbonate-type rock.

BACKGROUND OF THE INVENTION

Hydrocarbon recovery in naturally fractured reservoirs is typically very low. In medium to high-permeability naturally fractured carbonate reservoirs, in particular, oil recovery is often less than 15% of the calculated oil-in-place. In this case it is generally difficult to recover the oil from the matrix due to the easier flow path offered to the oil in the naturally fractures. Water flooding is often used to displace oil from the carbonate reservoir but again this is generally only effective in the presence of the higher permeability natural fractures.

As many carbonate oil reservoirs are mixed or oil-wet, spontaneous imbibition of the water from the water flood does not improve recovery from the bypassed natural fractures and matrix portion of the reservoir. One of the basic problems lies in increasing the sweep efficiency of water flooding. Injected water typically finds the production wells quickly due to the channeling of the water through the high permeability natural fracture system, leaving behind the bulk of the hydrocarbon in the matrix.

Even in cases where the imbibition or water flooding is successful, the process is very slow and/or water production or cycling very high. The process is hampered for example by mixed wettabilities.

The first use of semi-permeable membranes to create osmotic pressure for oilfield application has been previously described in the co-owned U.S. Pat. No. 6,069,118. The patent describes the use of a chemical potential gradient or osmotic pressure gradient to remove fracturing fluid from an artificially created fracture and thereby increasing the effective length of the created fracture.

SUMMARY OF THE INVENTION

This invention proposes a method to facilitate and speed up the recovery of hydrocarbon that would otherwise stay trapped in the matrix blocks of a naturally fractured reservoir.

Accordingly it is an aspect of the invention to deploy special additives that are injected during water flood operations and that force water into the matrix blocks to extract hydrocarbon into the fissure system. This would improve hydrocarbon recovery and reduce water cut.

According to another aspect, the invention proposes the utilization of the process of osmosis to create an osmotic pressure gradient so that fluids will be forced to flow with a purpose of displacing unrecovered or previously unrecoverable hydrocarbon and producing it through a wellbore.

The invention is partly based on the realization that semi-permeable or permeable membranes as for example described in U.S. Pat. No. 6,069,118 can facilitate not only the clean-up of fractures but could also increase the recovery rate of hydrocarbons from carbonate formations and/or assist water-flooding applications in subterranean reservoirs.

According to a preferred variant of the invention there are provided methods to establish a chemical potential or solute concentration gradient in the naturally fractured formation. The chemical potential (or solute concentration) gradient can be much greater than the hydrostatic pressure gradient created by the injection of fluid into the injection wellbore. This differential pressure is sufficiently large so that fluid displacement (in this case water displacing oil in the pore space of the matrix) will occur resulting in the increased recovery of oil.

According to another aspect of the invention, there is provided a method of first determining the in-situ properties of the fluids naturally present in the reservoir. The next step is to pump a fluid containing a membrane-forming material into the injection wellbore. The volumes to be pumped can be determined in each individual case with knowledge of the swept volume between the injection well and the producing wells. The membrane will provide a barrier between the water swept, higher permeability natural fractures and the matrix of the reservoir immediately adjacent to the natural fracture system. The next fluid pumped is a fluid with a low solute concentration (compared to the formation water in the matrix) to displace the water in the natural fracture leaving the membrane in place.

As the low solute fluid is injected, the natural process of osmosis will take place due to the chemical potential gradient that will occur because of the differences in solute concentration between the water in the natural fracture and the water in the matrix.

Additional details of this physico-chemical process can be found in the U.S. patent listed above and the several reference documents provided in the patent.

In a preferred embodiment of the above aspects of the invention, steps of the new methods may be repeated several times for example to refresh the low solute fluid or to replenish or reestablish the semi-permeable membrane.

These and other features of the invention, preferred embodiments and variants thereof, possible applications and advantages will become appreciated and understood by those skilled in the art from the following detailed description and drawings.

DETAILED DESCRIPTION OF THE INVENTION

Figure 1A:
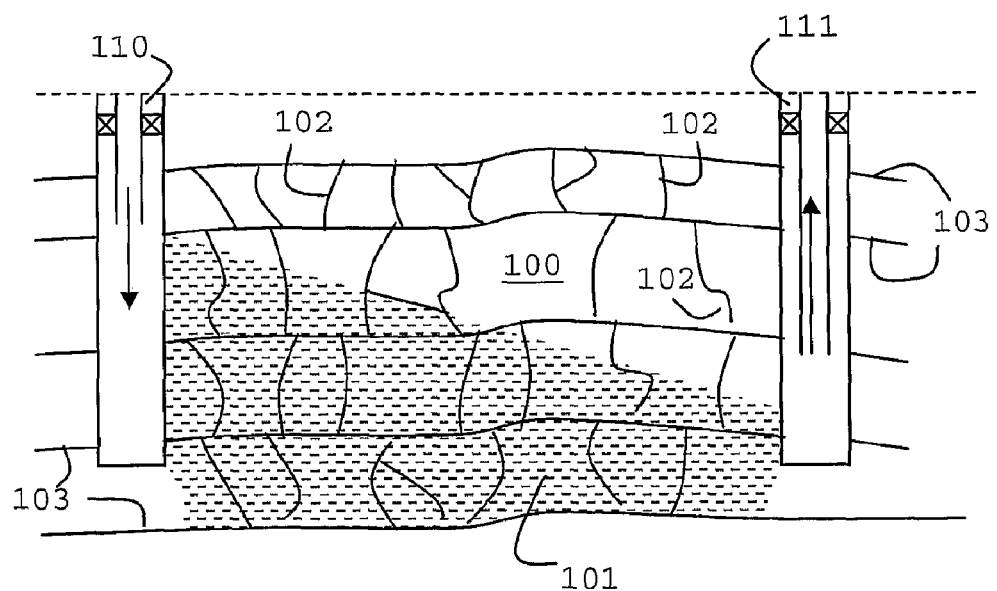
FIG. 1A is a schematic view of a cross-section of a carbonate reservoir between a producer well and a water injector.

In one particular example of the invention, a naturally fractured carbonate formation 100 is undergoing waterflood. More particularly it is assumed in this example that water breakthrough as indicated by horizontally dashed area 101 has occurred between a water injector 110 and a producer well 111 as shown in FIG. 1A. The formation is shown as being highly fractured by fractures 102. Bedding boundaries are shown as horizontal lines 103.

After understanding or estimating the volumetric conditions between the injector 110 and the producer 111 and knowledge of the physical properties of the water in the matrix of the formation 100, a fluid system containing a membrane-forming material is pumped into the injector well 110. The membrane 120 is allowed to form at the interface 121 of the natural fractures and the formation matrix before or while the fluid is displaced as shown in FIG. 1B.

Figure 1B:
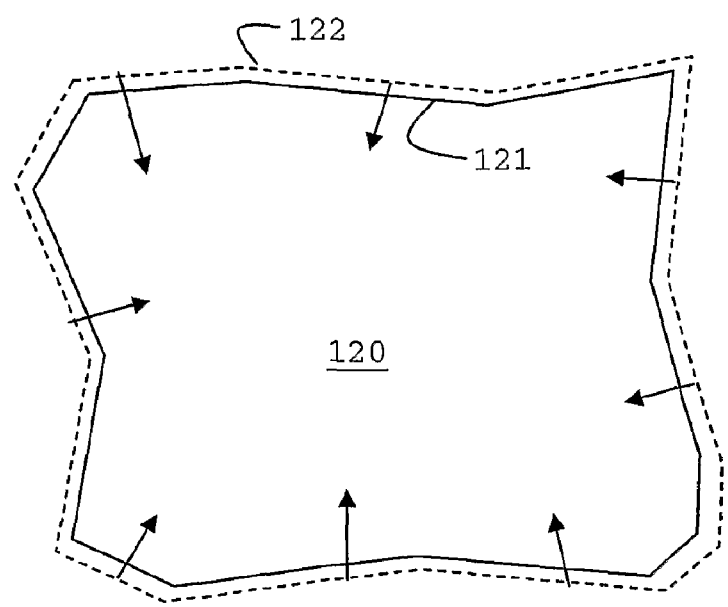
FIG. 1B shows a cross-sectional view of a part of the formation during or after a treatment in accordance with an example of the present invention.

In FIG. 1B, there is shown a cross-section of a part of the formation, e.g. as matrix block as described in more detail hereinbelow. As the fluid carrying the membrane-forming additives fills the fractures and void around the block 120, a membrane 122 is formed on the exposed surface 121 of the block 120. The membrane forming results in a film or skin-like substance that is semi-permeable to water moving between the natural fracture and the matrix. The fluid is displaced from the natural fracture system with a low solute fluid so that the maximum chemical potential gradient could be established across the semi-permeable membrane. An example of the low solute fluid is freshwater or water that is only slightly contaminated with other soluble parts such as salt.

Once this fluid is in place the osmotic pressure phenomena will spontaneously occur. The result will be that the parts of the low solute fluid in the natural fracture system will move across the semi-permeable membrane and displace the oil in the pore space of the matrix into the natural fracture system until the chemical potential gradient reaches equilibrium. This process is indicated by the arrows in FIG. 1B. Depending of the membrane material as described below, the oil may migrate through a membrane that is permeable to hydrocarbons or may leak through holes in the membrane.

Upon reestablishing water injection at the injector well the oil displaced from the matrix into the natural fracture system will be pushed to the producer and can be recovered. The process of pumping water with low soluble content may be able to be repeated several times before having to replenish/reestablish the semi-permeable membrane.

Figure 2:
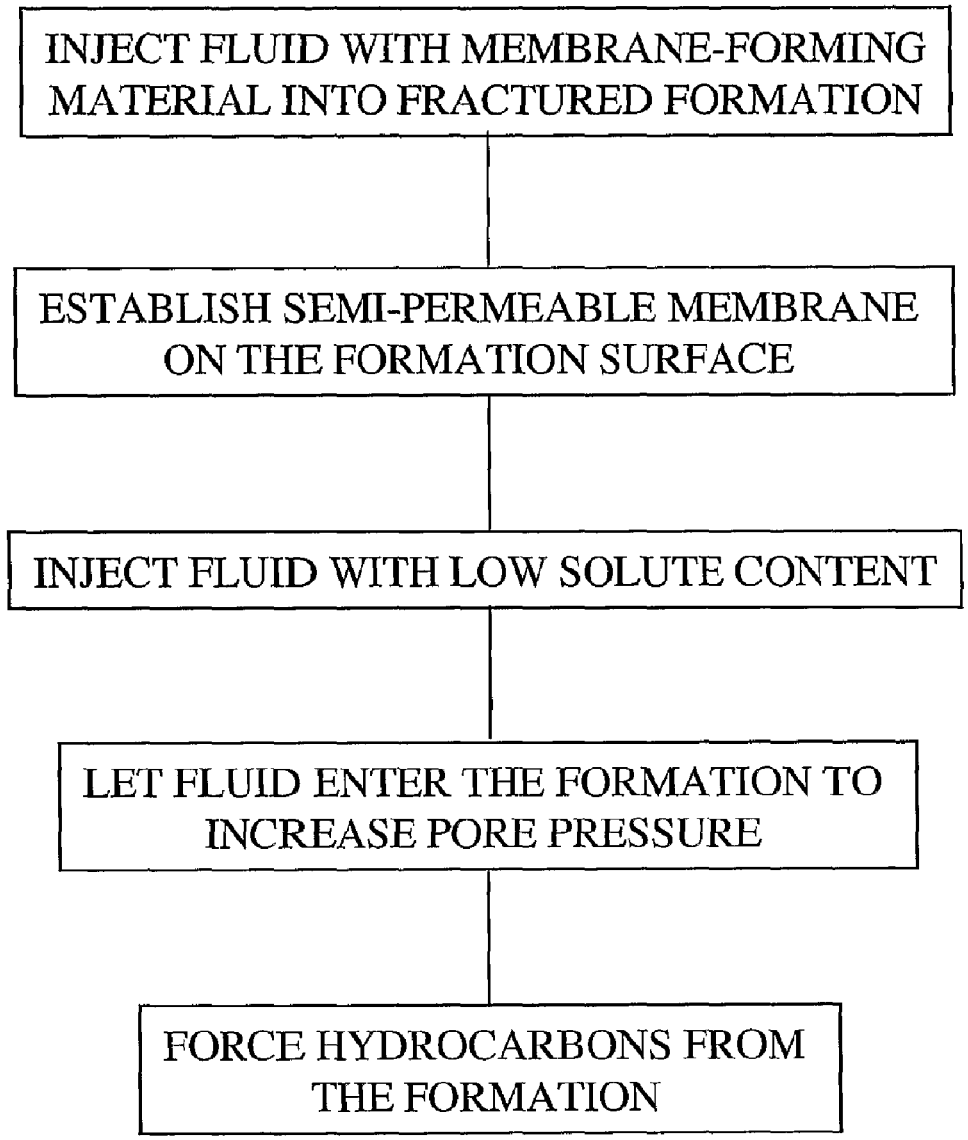
FIG. 2 is a flowchart showing steps in accordance with an example of the present invention.

The result of the above steps which are summarized in the flowchart of FIG. 2 is likely to increase the percentage of original oil-in-place that can be recovered.

In another example, the fluid injection step can be continuous with the addition of membrane-forming additives or fluid at a given time, followed by the low solute fluid, and alternating back and forth at given times when needed to replenish the semi-permeable membrane and extract more hydrocarbon from the matrix blocks. Monitoring of the production effluents by measuring flow rates, additives concentrations and other measurable operational parameters can be used to define the above injection sequence.

Unlike more conventional enhanced oil recovery (EOR) treatments, the process described here has the advantage of limiting the volume of fluids pumped to reasonable amounts. In a conventional EOR process applied to a matrix treatment, the total volume of fluid pumped is proportional to the total pore volume of the reservoir. For example a reservoir with a volume of 10 million cubic meters (e.g. 1 km×500 m×20 m) and with a porosity of 25% has a total pore volume of 2.5 million cubic meters. The total amount of treatment to be injected in the reservoir will be typically equal to that amount multiplied by a factor greater than 1. Using a factor 2 for the purpose of illustrating this effect would thus require pumping 5 million m3 of treatment fluid in the reservoir.

The invention described here takes full advantage of the very low contribution of the fracture network to the total porosity of the reservoir. Typical fracture porosity in sediment rock reservoirs (Carbonates and Sandstone) is 0.01% and in most cases less than 0.1%. Completely filling the natural fracture network in a 10 million cubic meters reservoir requires to inject typically 100,000 m3 of treatment fluid. That is 50 times less than for a conventional EOR treatment.

It is anticipated that the invention will apply mostly to naturally fractured sediment reservoirs as opposed to fractured basement reservoirs. In fractured basement reservoirs, such as granite reservoirs, the matrix porosity is generally negligible and the fluids are contained in the fractures. The effectiveness of the osmotic membrane placed on the surface of all fractures in a naturally fractured sediment reservoir will be a function of the matrix block size as described in FIG. 3.

Figure 3:
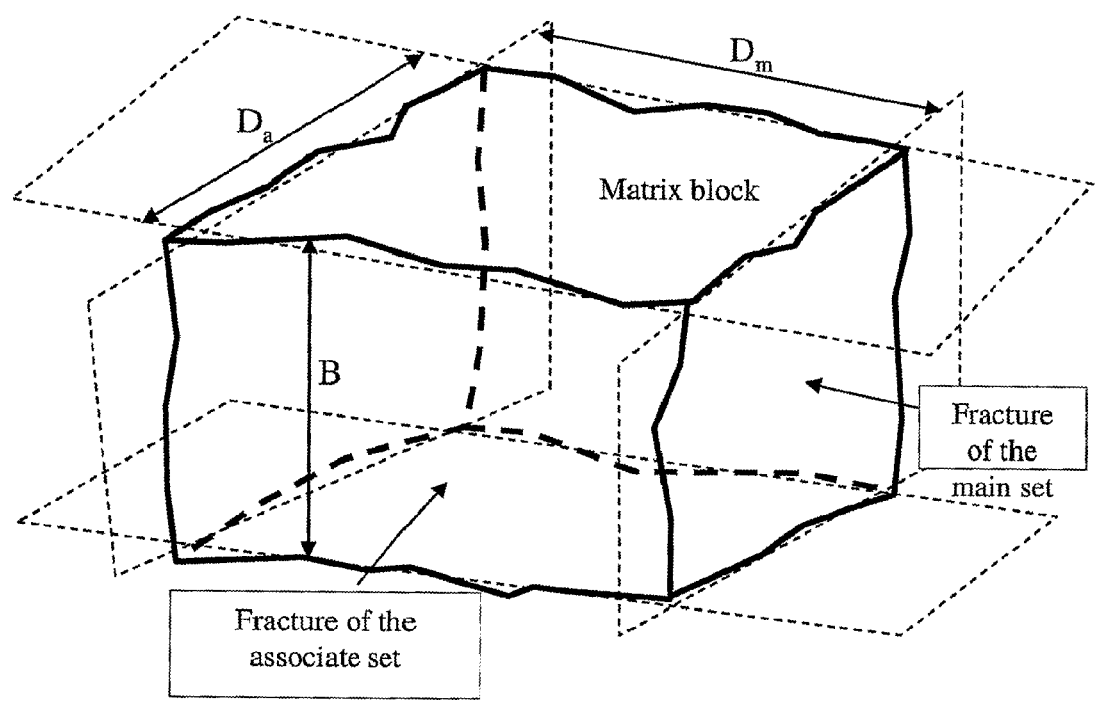
FIG. 3 is a perspective view of a matrix block to demonstrate the effectiveness of the novel treatment methods.

The matrix blocks are, by definition, limited by near vertical natural fracture planes and by near horizontal bedding boundaries on top and bottom as shown in FIG. 3. The height of the matrix blocks is typically equal to the bed thickness B containing the matrix block. The width of the matrix blocks depends of the fracture density. A typical situation is to find conjugate fracture sets, i.e. one fracture set that is oriented mainly parallel to the direction of maximum field stress, and one fracture set more or less perpendicular to that direction. The fractures parallel to the maximum stress are called the "main fracture set". The other fracture set is called the "associate fracture set". The fractures of the main set tend to be more conductive to the flow than the fractures of the associate set unless they are cemented or partially cemented.

The average matrix block size in a horizontal section is equal to the average distance $D_m$ between fractures of the main set, and the average distance $D_a$ between fractures of the associate set. It has been observed that $D_m$ and $D_a$ are generally strongly correlated to the bed thickness B with a simple proportional law:

$$D_m \approx k_m B \; D_a \approx k_a B \quad [1]$$

where the coefficients $k_m$ and $k_a$ depend on the mechanical properties of the rock. These coefficients typically take values in the range 1 to 2. Here 1.5 will be used for illustration.

The fracture density expressed as the average number of fracture per unit length is equal to $1/D_m$ for the main set and to $1/D_a$ for the associate set. The fracture density expressed as the average number of fractures per unit area is equal to $2/(D_m D_a)$. The fracture density expressed as the average number of fractures per unit volume is equal to $2/(B D_m D_a)$. A highly fractured reservoir will typically contain 1 fracture per meter 2 fractures per square meter, or 2 fractures per cubic meter) or more.

The matrix block volume is equal to $B D_m D_a$. The total surface area of the interface between the fractures and the rock matrix in the matrix block is equal to $2B(D_m+D_a)$. The effectiveness of the osmotic process will depend on several factors among which the surface/volume ratio R:

$$R = 2B(D_m + D_a)/(BD_m D_a) = 2\left(\frac{1}{D_m} + \frac{1}{D_a}\right) \quad [2]$$

The number R is equal to twice the sum of the fracture densities for the two fracture sets expressed in fracture per unit length.

The other factors influencing the effectiveness of the osmotic process are microscopic factors involving the permeability of the rock matrix near the fractures surfaces, the wettability of the pores and the nature of the fluids present inside the pores. The osmotic process will result in accelerating fluid exchanges between the rock matrix and the fractures. The average thickness X of rock near the fractures in which these exchanges will take place is a function of time t, as well as temperature, and the differential pressure between the matrix block and the fractures.

The recovery factor achieved by the osmotic process at time t will be directly proportional to the product R X(t). R X(t) is a dimensionless number. Assuming that recovery is mainly governed by diffusion type mechanisms here, it is expected that X(t) will vary proportionally to the square root of time, i.e.

$$X(t) \approx C\sqrt{t} \quad [3]$$

where the constant C will be indicative of the speed of the fluid exchanges.

The function C can be increased by the use of a combination of chemicals. For example, prior to the placement of the osmotic membrane in the fracture network, an acid treatment of the fracture faces is contemplated in order to decrease the "skin" between the fractures and the rock matrix. Further, surfactants can be injected into the fracture network in order to change the wettability of the rock from oil-wet to water-wet.

When injecting fluids in natural fracture networks most of the fluids will tend to flow in the most conductive fractures. This can result in a very poor coverage of the treatment. The placement of the treating fluids (acid, surfactant, chemicals for the osmotic membrane) inside the fracture network can be rendered more uniform by using "diverting" agents such as fibers, shear thickening or shear gelling fluids, and viscoelastic fluids.

Suitable chemical species to establish the Osmotic barrier around matrix blocks as described above can be found for example in the above-referenced U.S. Pat. No. 6,069,118 which describes osmotic barriers for a different purpose.

As described in the '118 patent, the effect of the nature of the chemical species on osmotic pressure is, in theory, irrelevant. In practice, the size and electrostatic charge of the particular chemical species will of course affect osmotic flow. The list of possible materials that can form a membrane suitable for the present invention is long. Yet the person skilled in the art of membrane chemistry, working in concert with one skilled in the art of reservoir engineering can select suitable candidates for the membrane material by following the general guidance provided in the present specification, by following the teachings in the art, and by following these specific guidelines.

The following references are helpful in this regard and are hereby incorporated by reference into the present Application. H. P. Gregor and C. D. Gregor, Synthetic-Membrane Technology 239, Scientific American 112 (1978); R. Durbin, Osmotic Flow and Water Across Permeable Cellulose Membranes, 44 J. General Physiol. 315 (1960). Preferred membranes of the present invention should possess the following attributes. First, the membrane must be water-wettable. Second, the membrane material once in place, should comprise pore spaces of sufficient size to yield acceptable capillary pressures. Naturally, the membrane should be easy and cost-effective to establish. And of course, numerous more specific considerations, known to the one skilled in the arts to which this invention is directed, will direct the engineer or well operator to the optimal membrane candidate.

The ideal membrane is one that is freely permeable to water, but impermeable to all solutes, and even more preferably permeable to oil in a reverse direction to the water.

Numerous materials can be to establish the membrane of the present invention. Several membrane compositions suitable upon modification for use in accordance with the present invention include those disclosed in U.S. Pat. No. 5,041,225, and U.S. Pat. No. 4,851,395 (both incorporated herein). In particular, the U.S. Pat. No. 4,851,394 discloses membranes comprised of polyhydroxy compounds. Both of these patents are incorporated by reference herein. Galactomannans crosslinked with boric acid, and cellulose acetate (commonly used in dialysis) can also form membranes suitable for use in the present invention.

In one preferred embodiment of the present invention, the membrane is comprised of polyhydroxy compounds; in one particularly preferred embodiment, it is comprised of poly ethylene glycol. Other types of materials are also particularly suitable: e.g., J100 consisting of colloids/polymers; J126 consisting of aluminosilicate and fatty acid; J478, a starch polymer; J84, which is silica flower; and J418, silica flour all sold by Schlumberger Dowell as conventional fluid-loss additives, originally designed for a separate purpose, but nonetheless suitable for the present invention.

The membrane of the present invention can also be prepared from inorganic materials. A copper hexacyanoferrate membrane can be formed either by sequential injection of solutions, or by the injection of one solution followed by the diffusion of the solute from a second solution. Copper sulfate and potassium ferrocyanide are known to react on contact to form a copper hexacyanoferrate membrane. In addition silicates can form membranes suitable for the present invention.

In the foregoing description, for the purposes of illustration, various methods and/or procedures were described in a particular order. It should be appreciated that in alternate embodiments, the methods and/or procedures may be performed in an order different than that described.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments may be substituted and/or combined. Thus, the above description should not be taken as limiting the scope of the invention, which is defined by the appended claims.

We claim:

1. A method of increasing the recovery of hydrocarbons from a reservoir having natural fractures and which is undergoing waterflood where the reservoir is in communication with an injection wellbore for fluid to be delivered to the reservoir and a production wellbore for hydrocarbon production from the reservoir, comprising the steps of
   injecting through the injection wellbore into the fractures in the reservoir a membrane-forming fluid to form a membrane over the surface of at least part of formation adjoining the fractures,
   wherein the membrane-forming fluid comprises material selected from the group consisting of hydroxy compounds, polyhydroxy compounds, polyethylene glycol, galactomannans crosslinked with boric acid, cellulose acetate, silicates, and copper hexacyanoferrate;
   injecting through the injection wellbore into the reservoir a fluid to establish a chemical potential gradient across the membrane and letting fluid enter the formation across the membrane to increase the pressure inside the formation and to force additional hydrocarbon from the formation to the production wellbore.

2. The method of claim 1 wherein fluid is used to increase the pore pressure in the formation.

3. The method of claim 1 wherein the reservoir is a carbonate reservoir.

4. The method of claim 1 comprising the step of using a diverting fluid when injecting the membrane-forming fluid.

5. The method of claim 1 wherein the step of injecting the fluid to establish a chemical potential gradient is repeated one or more times to re-establish the chemical potential gradient.

6. The method of claim 1 wherein the step of injecting the membrane-forming fluid is repeated one or more times to re-establish the membrane.

7. The method of claim 1 wherein the step of injecting the fluid to establish a chemical potential gradient is repeated one or more times to re-establish the chemical potential gradient and the step of injecting the membrane-forming fluid is repeated one or more times to re-establish the membrane.

8. The method of claim 1 further comprising the step of removing depositions from the formation surface prior to injecting the membrane-forming fluid.

9. The method of claim 8 wherein the step of removing depositions from the formation surface prior to injecting the membrane-forming fluid includes the step of injecting an acid into the formation.

10. The method of claim 1 further comprising the step of changing the wettability of the formation surface prior to injecting the membrane-forming fluid.

11. The method of claim 10 wherein the step of changing the wettability of the formation surface prior to injecting the membrane-forming fluid includes the step of injecting a surfactant-carrying fluid.

12. The method of claim 1 further comprising the step of using diverting agents to enhance the flow of injected fluids into fractures in the formation.

13. The method of claim 12 further wherein the diverting agents are selected from the group consisting of fibers, shear thickening or shear gelling agents, or visco-elastic surfactants.

14. The method of claim 1 carried out after waterflood injected through the injection well has already reached the production well.

* * * * *